United States Patent
Hochwimmer et al.

(10) Patent No.: US 7,353,210 B2
(45) Date of Patent: Apr. 1, 2008

(54) ELECTRONIC MEANS OF PAYMENT WITH INDIVIDUALLY SETTABLE SECURITY FEATURES FOR THE INTERNET OR FOR MOBILE NETWORKS

(76) Inventors: Ralf Hochwimmer, Fichtenstrasse 13a, Ottenhofen (DE) 85570; Heiko Plöhn, Rotwandweg 3a, Taufkirchen (DE) 82024; Volker Rudolph, Am Nymphenbad 2, München (DE) 81245; Karsten Schulze, Im Jägerfeld 42, Halbergmoos (DE) 85399

( * ) Notice: Subject to any disclaimer, the term of this patent is extended or adjusted under 35 U.S.C. 154(b) by 0 days.

(21) Appl. No.: 11/008,079

(22) Filed: Dec. 9, 2004

(65) Prior Publication Data
US 2005/0149456 A1    Jul. 7, 2005

Related U.S. Application Data

(63) Continuation of application No. PCT/EP03/02811, filed on Mar. 19, 2003.

(30) Foreign Application Priority Data
Jun. 10, 2002    (DE) ................. 102 25 711

(51) Int. Cl.
*H04K 1/00* (2006.01)
*H04L 9/00* (2006.01)
(52) U.S. Cl. ................ 705/64; 705/74; 235/379; 340/825; 379/91.01; 379/91.02; 902/2
(58) Field of Classification Search ............... 705/64, 705/74; 380/232; 235/379; 340/825; 379/91; 902/2
See application file for complete search history.

(56) References Cited

U.S. PATENT DOCUMENTS

| 6,016,484 | A | 1/2000 | Williams et al. |
| 6,757,719 | B1 * | 6/2004 | Lightman et al. ........... 709/219 |
| 6,971,030 | B2 * | 11/2005 | Dutta ......................... 380/30 |

(Continued)

FOREIGN PATENT DOCUMENTS

DE    38 04 618 A1    8/1989

(Continued)

OTHER PUBLICATIONS

Hankel, J., "Bezahlen Auf Draht E-Payment: Wie Der Rubel Ins Rollen Kommt," CT Magazin Fuer Computer Technik, Verlag Heinz Heise GmbH, Hannover, DE, No. 6, pp. 270-281, Mar. 12, 2001, with attached English language abstract.

*Primary Examiner*—Bradley B. Bayat
(74) *Attorney, Agent, or Firm*—Houston Eliseeva LLP

(57) ABSTRACT

Electronic means of payment require specific procedures concerning the use thereof as well as set security features. Disclosed is a means of payment allowing the user to add individual security features, comprising the use of specific devices that are available to the user, the purchasing procedure, and additional general conditions pertaining to purchasing goods and services. The electronic means of payment can combine existing payment systems by making the payment systems selectable and allowing individual security features to be adjusted. The popular credit card can become far more secure when purchasing goods and services by combining the credit card with devices providing increased security, for a mobile phone, and adequate general conditions. The user of the means of payment can make payments in an individual manner according to the individual merchandise or service that he/she would like to purchase.

42 Claims, 3 Drawing Sheets

U.S. PATENT DOCUMENTS

| | | | |
|---|---|---|---|
| 2002/0004783 A1* | 1/2002 | Paltenghe et al. | 705/41 |
| 2002/0026412 A1 | 2/2002 | Kabin | |
| 2002/0052754 A1* | 5/2002 | Joyce et al. | 705/1 |
| 2002/0107766 A1* | 8/2002 | Sioufi | 705/35 |
| 2002/0138751 A1* | 9/2002 | Dutta | 713/200 |
| 2002/0138771 A1* | 9/2002 | Dutta | 713/202 |
| 2003/0026404 A1* | 2/2003 | Joyce et al. | 379/144.01 |
| 2004/0030657 A1* | 2/2004 | Holm-Blagg et al. | 705/65 |
| 2004/0122767 A1* | 6/2004 | Sanchez | 705/40 |
| 2004/0230495 A1* | 11/2004 | Lotvin et al. | 705/26 |

FOREIGN PATENT DOCUMENTS

| | | |
|---|---|---|
| DE | 199 38 695 A1 | 2/2001 |
| DE | 100 17 644 A1 | 10/2001 |
| DE | 100 35 581 A1 | 1/2002 |
| DE | 100 40 644 A1 | 2/2002 |
| DE | 101 21 726 A1 | 11/2002 |
| EP | 0 917 120 A2 | 5/1999 |
| WO | WO 01 03033 A1 | 1/2001 |
| WO | WO 01/04771 A2 | 1/2001 |

* cited by examiner

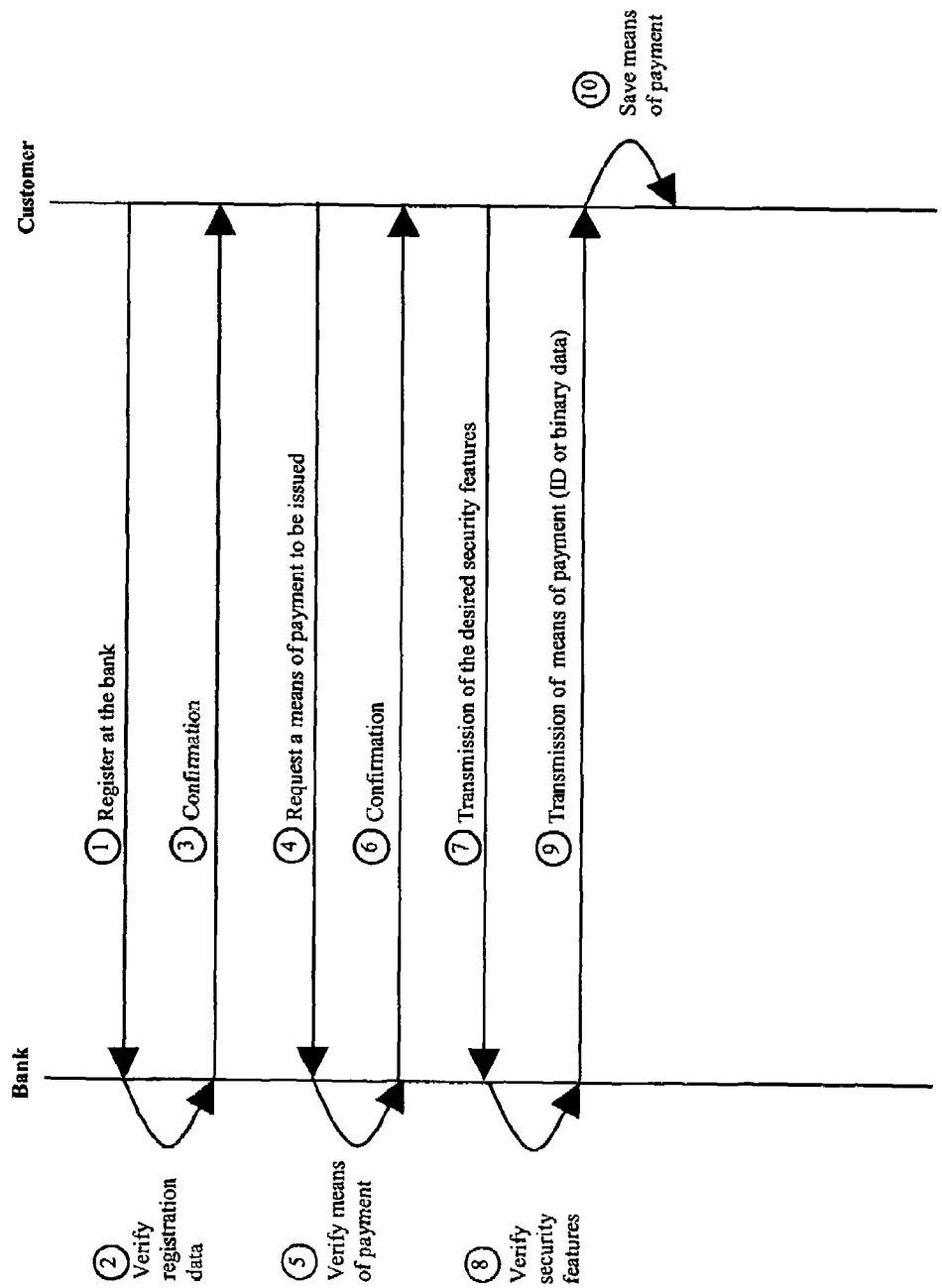
Figure 1 Creation of the means of payment

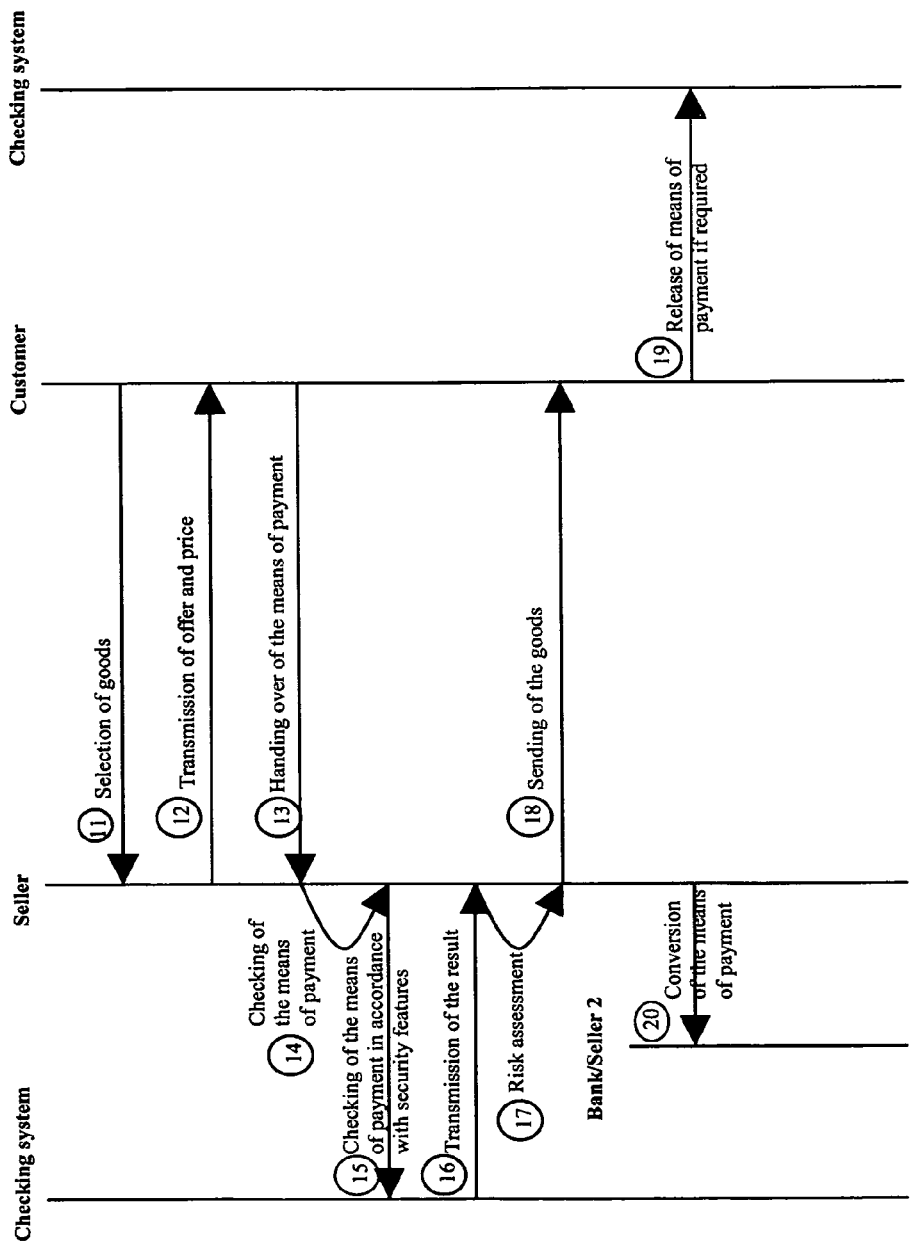
Figure 2 Use of the means of payment

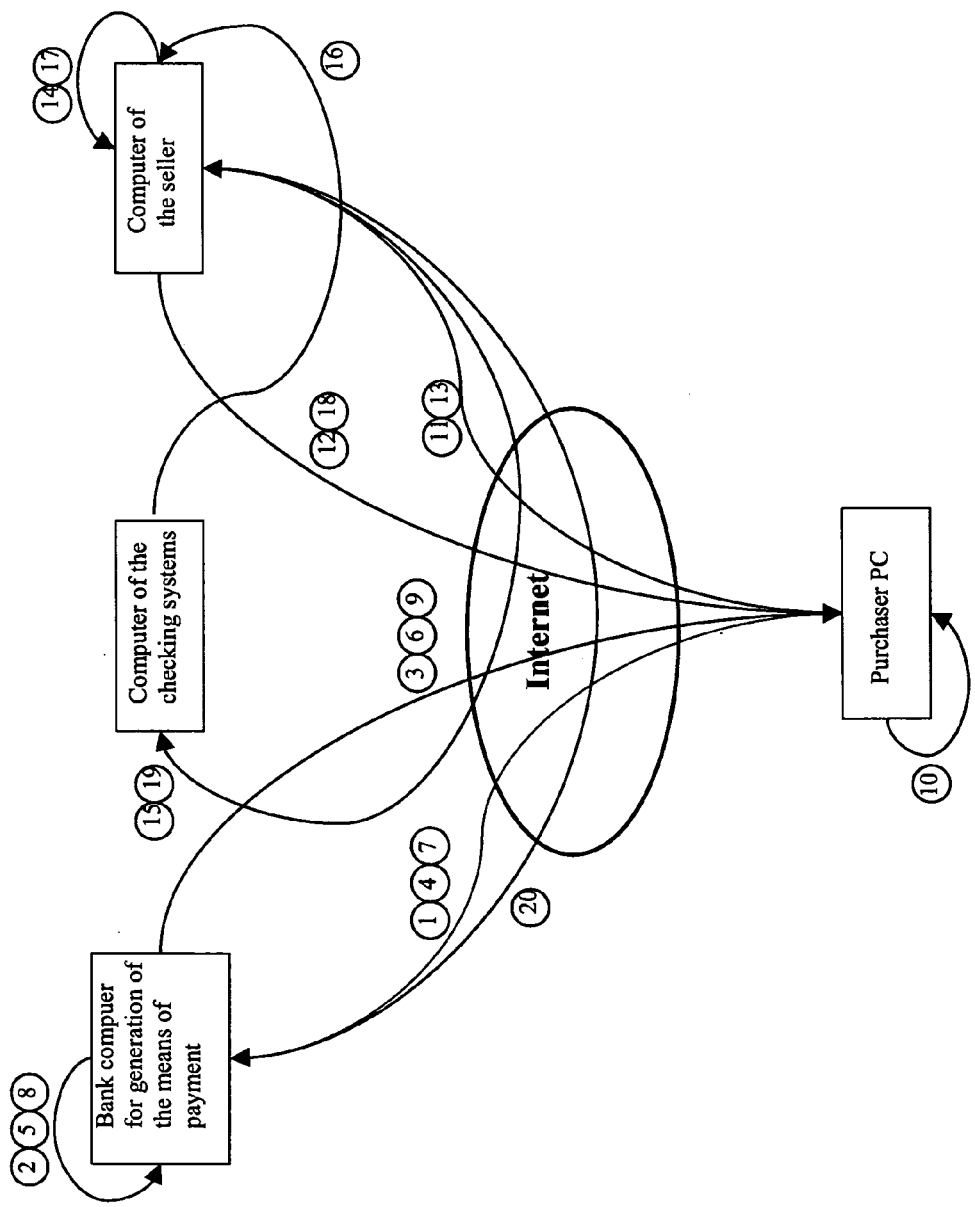
Figure 3 Generation and use of the means of payment over unsecured networks (Internet)

ELECTRONIC MEANS OF PAYMENT WITH INDIVIDUALLY SETTABLE SECURITY FEATURES FOR THE INTERNET OR FOR MOBILE NETWORKS

RELATED APPLICATIONS

This application is a Continuation of PCT application Ser. No. PCT/EP03/02811 filed on Mar. 19, 2003 (which was published in German under PCT Article 21(2) as International Publication No. WO 03/105033) which claims priority to German Application No. DE 102 25 711.6, filed on Jun. 10, 2002, both of which are incorporated herein by reference in their entirety.

BACKGROUND PRIOR ART

The purchaser uses the systems offered to carry out transactions in electronic networks, the internet or mobile phone, only on a very restricted basis. Although there is a multitude of existing payment systems on the internet, they are clearly not used to an adequate extent. All systems operate with already existing and specified procedures for use of a means of payment. The systems prescribe how the customer must pay. Examples are:
1. credit card;
2. virtual wallet;
3. intermediary or cash collector (e.g. Firstgate);
4. dialler software (e.g. 0190 numbers);
5. linked through hardware (e.g. Paybox);
6. account systems; and
7. electronic cash/cheque.

Payment by credit card is widespread. Here it is to some extent impossible for the customer to transmit his credit card details unencrypted. The disclosure of such data is not in the interest of the customer, and also not in the interest of the credit card companies. An especially high level of misuse is observed in connection with payments by credit card over the internet.

The virtual wallet involves a simple, non-configurable system which is implemented by a main program on a server. Patent specification EP 0 917 120 A2 describes such a system comprised of several distributed parts of a wallet. With the aid of the wallet, a purchase may be made that is anonymous as far as the seller is concerned. Due to the distribution of the parts, data remains on site.

Dialler software undertakes the function of the virtual wallet. Payments via this system are not at all transparent for the customer. He is completely reliant on the information supplied by the seller.

Hardware-linked systems such as e.g. from Paybox are based on fixed procedures and can be implemented only on certain hardware.

There are also account systems for settling reciprocal claims between dealer and purchaser through fixed procedures.

Laid-open patent application DE 100 35 581 describes a two-account system. The purchaser fills up an account and processes the payment through this account by means of a mobile phone and the internet. This involves use of the security features of the mobile phone.

SUMMARY OF THE INVENTION

Electronic cash can as yet be generated and used only in accordance with software specifications. At present there are no means of generating electronic cash to match the needs of the customer for use as a means of payment as in this invention.

The problem now is to provide an electronic means of payment which the purchaser can equip with his own security features. The purchaser or user of the means of payment should be able to determine for themselves the security features of the means of payment, procedures of payment transactions, parties involved in the payment transactions, terms and conditions of business, etc. In addition the system must be easy to use.

The invention relates to a payment system for cashless payment in electronic networks, in particular the internet and mobile phone networks. The payment system allows a purchaser to use a means of payment personally formulated by him and provided with individual security features.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 is a diagram illustrating theist process that covers the generation of the means of payment according to the present invention;

FIG. 2 is a diagram illustrating a 2nd process showing the use of the means of payment according to the present invention; and FIG. 3 is a diagram illustrating the generation and use of the means of payment over unsecured networks (internet) according to the present invention.

DETAILED DESCRIPTION OF THE PREFERRED EMBODIMENTS

The method is comprised of two processes, separable from one another, which are harmonized with one another. The 1st process covers the generation of the means of payment (FIG. 1), the 2nd process provides for the use of the means of payment (FIG. 2). The method is operated over unsecured networks with the aid of electronic equipment (FIG. 3).

Process 1/Generation of the Means of Payment

The customer applies to a bank or similar financial institution (e.g. also a mail order company) for his electronic means of payment (step 1). This is effected by means of a suitable secure connection over open networks or in person. After the personal data of the customer have been checked (step 2) and confirmed (step 3), the customer requests an electronic means of payment (step 4). Once the creditworthiness of the customer has been established (step 5) and the result communicated to the customer (step 6), the customer is able to specify his security features (step 7). Alongside those of the bank, the customer can set his individual security features and characterize the course of the payment transactions. The customer thus has the possibility of specifying:

the maximum amount of payment;
the validity of the means of payment (limited by time, specific transactions or business sectors, categories of goods, particular persons, etc.);
the course of the payment transaction;
necessary security questions/actions before the transaction;
restriction of usability of the means of payment to certain media;
possible multiple use of the means of payment;
his own passwords to release the means of payment;
release only by his SmartCard; and
signing with the signature of the customer.

After these individual security features have been verified by the bank (step 8), this data (data relating to the transaction process in readable form) is packaged into an electronic means of payment. At the same time the means of payment may be given a reference to a virtual and anonymous account to be set up by the bank or by another control system, or to the specific account details of the customer. By setting up an anonymous account it is possible for all subsequent payments by this means of payment to be made anonymously, since the subsequent seller is unable to obtain any personal data. In this case, however, the customer must make a payment into the virtual account or else receive from the bank an agreed credit framework (similar to a credit card). If this payment is made in cash, e.g. at a machine, then the customer is also anonymous to the bank. Finally this electronic means of payment is signed by the bank and transmitted to the customer (step 9). Transmission may take place by e-mail, data storage medium (floppy disc), infrared (wireless) connection between two electronic devices, etc. The signature enables a subsequent seller to verify the validity and the usability of the means of payment for a specific transaction.

Process 2/Use of the Means of Payment

The customer now has an electronic means of payment on his medium (hard disc of his computer, mobile phone, organizer or other electronic device).

The means of payment is assigned a program which makes it possible to use the means of payment. If it is intended that this means of payment will be used several times by the customer, then this program requires additional functions to administer, e.g. the residual amount, recipients of payment, etc. The program may be available e.g. in the form of a so-called browser plug-in or as an independent application or as part of the means of payment.

The inputs required before a payment (amount details, recipient of payment, invoice number) are then facilitated by this program. To enhance security, the means of payment may be signed and/or encoded by the customer. Open connections may also be encrypted, and the program is able to access a device-side security mechanism such as a Smart-Card device, an SIM card in the mobile phone or a stored code.

After the seller has transmitted his price offer for the selected goods (steps 11 and 12), the means of payment is transmitted to the seller (step 13). The seller requires a program which accepts the means of payment and verifies the security features provided (step 14). The program decodes the received means of payment, if encrypted, and is able to carry out the following further tasks:

check the signature of the bank;
check the validity of the means of payment;
check the amount entered;
check the cover;
establish the usability of the means of payment for this transaction; and
implement the payment procedure determined by the customer.

The program determines the validity and cover of the means of payment by dialling or accessing the computer of the checking authority named in the means of payment. For this purpose the means of payment is transmitted to the checking computer (step 15), which confirms the cover and if necessary the usability of the means of payment for this transaction. In addition to the confirmation, the other information is transmitted to the seller (step 16). This is evaluated by the seller (step 17), who then decides whether or not to supply the goods or services under the conditions stated in the means of payment (terms and conditions of the customer) (step 18). The financial transaction may take place at the same time as delivery of the goods or only after release of the means of payment (step 19) by the customer. This avoids payment without an actual delivery of the goods, since as a rule the customer will instigate payment only following receipt of the goods. After optional release by the customer, the amount is transmitted to the seller.

Embodiments

Payment for Services Over the Internet (Micro-Payment)

The customer dials in to the bank computer of his bank over a secure connection (SSL). There he requests the issuing of an anonymous, electronic means of payment for multiple use. For this he or she specifies the following security features:

maximum value of the means of payment;
period of validity of the means of payment;
specification of the products to be paid for by the means of payment (e.g. purchasable information sheets from establishments);
specification that use is possible only from his own PC (personal computer); and
signature of customer necessary before any payment.

These security features are now checked by the bank computer (e.g. maximum amount and period of validity). These security features are packaged into the electronic means of payment in readable form, together with bank-specific details (reference to the virtual account to be set up, bank sort code, access data for the bank computer). After transfer of the desired amount from the giro account of the customer, the means of payment is sent to the customer. The customer also receives the necessary code information, for subsequent signing of payment instructions.

The customer now selects the service, obtains a price quotation from the seller, and must specify his mode of payment. After selecting the mode of payment by electronic means of payment, a suitable browser plug-in is started. By means of the plug-in, the customer confirms the amount and the recipient. The means of payment with this payment information is then signed, and transmitted to the internet server of the seller. The seller's program determines from the means of payment the access data to the bank computer, where it checks that the means of payment is covered. The bank computer is able to make this check on the basis of the readable information regarding the virtual account, and the customer signature. After receiving positive confirmation from the bank computer, the seller releases access to the desired information. At the same time, by transmitting his bank account details to the bank computer, the seller activates the corresponding transmission from the virtual account to the account of the seller. The virtual account is reduced by the corresponding amount. The same electronic means of payment may be used repeatedly in the same manner until the virtual account of the customer is exhausted.

Benefits

The main benefit of this novel solution is that the customer or purchaser may themselves determine the security features of the means of payment, and at the same time expand the functions of the means of payment. The customer can define transaction procedures which restrict the validity of the means of payment, thereby matching the security requirement to the ideas of the customer. So for example the customer may request a means of payment for his children which can not be used for example to pay for cigarettes and for literature liable to corrupt the young.

The hardware cost of this solution is very low, and is limited in the simplified version to a computer authority on the part of the bank or checking system. For the expanded version, the customer needs to have a card reader. The need for the customer and the seller to have a PC may be regarded as given, since no excessive demands are made on the PCs concerned. Nor does it matter what operating system is used, since the very simple procedures can be run on all operating systems.

The solution presented is not limited to certain media or hardware systems. This means of payment may be used in all data transmission systems (internet, mobile phone networks). The facilities on the part of the seller also include an internet connection, so that the connection to the checking authority can be made.

The system presented is very easy to use for all concerned. The necessary steps are prescribed by the system and may be understood by average PC users. On the part of the purchaser, no software needs to be installed for the simplified version. In the expanded version, a program is installed to support the administration of means of payment.

The program on the seller's side implements the processing of simple procedures, which can be dealt with by an average PC user.

With this system it is possible to define means of payment which the customer may define for different purposes, but without having to learn the processes afresh during definition or implementation. For example the customer may define means of payment for a friend, which this person alone may use in a particular business or sector (gift voucher). Equally he may define a means of payment with a high maximum value, e.g. to purchase a car. As a third means of payment he may define a means of payment for multiple use for payments over the internet (small amounts). These means of payment will differ mainly in the individually defined security features, which also correspond to the security requirements of the customer. Where the means of payment have a high value, the customer will be more likely to take a high administrative cost into account. In the micro-payment segment, on the other hand, he will aim for the simplest possible use. The processes involved in creation and use are the same for all means of payment.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of generating electronic means of payment, comprising:
   a customer selecting security features for the means of payment, security features being at least one of a necessary security question, restrictions on a usability of the means of payment for purchase of certain goods, passwords to release the means of payment, or release of the means of payment by a smartcard;
   the customer requesting the means of payment from a financial institution and sending the selected security features to the financial institution, wherein the means of payment is independent of any specific seller or seller banking institution;
   the financial institution generating the means of payment on a computer of the financial institution using the selected security features desired by the customer;
   transmitting the means of payment electronically to the customer, who stores the means of payment in an electronic medium;
   the customer transmitting the means of payment electronically to multiple sellers for payment in transactions from the electronic medium;
   each of the sellers verifying the means of payment with respect to the selected security features by providing the means of payment to the financial institution to confirm the usability of the means of payment for the transactions based on the selected security features; and
   the financial institution verifying whether the means of payment is usable and providing no personal data of the customer, making the means of payment anonymous for the customer.

2. A method of generating electronic means of payment according to claim 1, further comprising:
   the customer making a payment of cash at the financial institution;
   the financial institution creating a virtual account for the means of payment using the cash;
   the financial institution generating an anonymous means of payment based on the virtual account.

3. A method of generating electronic means of payment according to claim 2, further comprising securing the steps of the customer requesting of the means of payment and the financial institution transmitting the means of payment using encryption and digital signatures.

4. A method of generating electronic means of payment according to claim 3, wherein one or more of the steps of the customer selecting security features and the customer requesting the means of payment are implemented within independent programs or as plug-ins, or are effected with the aid of a program provided in the means of payment.

5. A method of generating electronic means of payment according to claim 4, wherein the step of the customer selecting security features for the means of payment comprises the customer selecting a course of the means of payment.

6. A method of generating electronic means of payment according to claim 2, wherein the step of the customer selecting security features for the means of payment comprises the customer selecting a person who may use the means of payment.

7. A method of generating electronic means of payment according to claim 6, wherein the step of the customer selecting security features for the means of payment comprises the customer selecting institutions or persons who may accept the means of payment.

8. A method of generating electronic means of payment according to claim 7, wherein the step of the customer selecting security features for the means of payment comprises the customer selecting a category of goods or services which may be purchased by the means of payment.

9. A method of generating electronic means of payment according to claim 8, wherein the step of the customer selecting security features for the means of payment comprises the customer selecting a technical facility via which the means of payment must be used.

10. A method of generating electronic means of payment according to claim 9, wherein the step of the customer selecting security features for the means of payment comprises the customer defining the institutions or persons who must agree to the purchase using the means of payment.

11. A method of generating electronic means of payment according to claim 10, further comprising:
the customer selecting the means of payment to have multiple uses, and making multiple copies of the means of payment or the means of payment allowing debiting of several partial amounts which may be credited to several sellers.

12. A method of using a means of payment generated according to claim 11,
wherein the customer, following transmission of a price quotation for goods or services, transmits the means of payment from a technical facility to the computer of the seller;
wherein this means of payment is transmitted by the computer of the seller to a checking system for checking;
wherein the checking system checks the means of payment for validity and creditworthiness, and transmits information on the payment procedure to the seller;
wherein the seller on receipt of information from the checking system is able to check and accept the means of payment;
wherein the seller delivers the goods or service; and
wherein the customer on receipt of the goods or service releases the means of payment.

13. A method of using a means of payment according to claim 12, wherein the releasing the means of payment by the customer is dispensed with.

14. A method of generating electronic means of payment according to claim 1, further comprising securing the steps of the customer requesting of the means of payment and the financial institution transmitting the means of payment using encryption and digital signatures.

15. A method of generating electronic means of payment according to claim 1, wherein one or more of the steps of the customer selecting security features and the customer requesting the means of payment are implemented within independent programs or as plug-ins, or are effected with the aid of a program provided in the means of payment.

16. A method of generating electronic means of payment according to claim 1, wherein the step of the customer selecting security features for the means of payment comprises the customer selecting a course of the means of payment.

17. A method of generating electronic means of payment according to claim 1, wherein the step of the customer selecting security features for the means of payment comprises the customer selecting a person who may use the means of payment.

18. A method of generating electronic means of payment according to claim 1, wherein the step of the customer selecting security features for the means of payment comprises the customer selecting institutions or persons who may accept the means of payment.

19. A method of generating electronic means of payment according to claim 1, wherein the step of the customer selecting security features for the means of payment comprises the customer selecting a category of goods or services which may be purchased by the means of payment.

20. A method of generating electronic means of payment according to claim 1, wherein the step of the customer selecting security features for the means of payment comprises the customer selecting a technical facility via which the means of payment must be used.

21. A method of generating electronic means of payment according to claim 1, wherein the step of the customer selecting security features for the means of payment comprises the customer defining the institutions or persons who must agree to the purchase using the means of payment.

22. A method of generating electronic means of payment according to claim 1, further comprising:
the customer selecting the means of payment to have multiple uses, and making multiple copies of the means of payment or the means of payment allowing debiting of several partial amounts which may be credited to several sellers.

23. A method of using a means of payment generated according to claim 1,
wherein the customer, following transmission of a price quotation for goods or services, transmits the means of payment from a technical facility to the computer of the seller;
wherein this means of payment is transmitted by the computer of the seller to a checking system for checking;
wherein the checking system checks the means of payment for validity and creditworthiness, and transmits information on the payment procedure to the seller;
wherein the seller on receipt of information from the checking system is able to check and accept the means of payment;
wherein the seller delivers the goods or service; and
wherein the customer on receipt of the goods or service releases the means of payment.

24. A method of using a means of payment according to claim 23, wherein the releasing the means of payment by the customer is dispensed with.

25. A method of using a means of payment according to claim 23 further comprising securing the steps of the customer requesting of the means of payment and the financial institution transmitting the means of payment using encryption and digital signatures.

26. A method of using a means of payment according to claim 23, wherein one or more of the steps of the customer selecting security features and the customer requesting the means of payment are implemented within independent programs or as plug-ins, or are effected with the aid of a program provided in the means of payment.

27. A method of generating electronic means of payment according to claim 1, further comprising a step of transmitting terms and conditions of the customer to the seller.

28. A method of generating electronic means of payment according to claim 1, further comprising a step of the seller accepting the terms and conditions of the customer.

29. A method of generating electronic means of payment according to claim 1, further comprising a step of the customer releasing payment.

30. An electronic payment method providing customer settable security features, the method comprising requesting payments from a financial institution by the customer, wherein the means of payment is independent of any specific seller or seller banking institution and customer selects security features for the means of payment, security features being at least one of a necessary security question, restrictions on a usability of the means of payment for purchase of certain goods, passwords to release the means of payment, or release of the means of payment by a smartcard;

generating the payments on a computer of the financial institution using individual security features that are specified by the customer and different for each one of payments, wherein a computer program is used for the input of the security features;

the customer storing the means of payment in an electronic medium; and transmitting the payments electronically to multiple sellers, who each verify the means of payment with respect to the selected security features by providing the means of payment to the financial institution to confirm the usability of the means of payment for the transactions based on the selected security features; and the financial institution verifying whether the means of payment is usable and providing no personal data of the customer, making the means of payment anonymous for the customer.

31. A method as claimed in claim 30, wherein the step of requesting payments is performed by the customer using a computer connected to the internet.

32. A method as claimed in claim 30, wherein the step of requesting payments is performed by the customer using a mobile phone.

33. A method as claimed in claim 30, wherein the step of requesting payments is performed by the customer using an automatic bank terminal.

34. A method as claimed in claim 30, wherein the security features are stored in a data object and made available by the program individually.

35. A method as claimed in claim 30, wherein the security features include which sellers may receive the payments.

36. A method as claimed in claim 30, wherein the security features are added by manual data input.

37. A method as claimed in claim 30, wherein the step of generating the payments comprises including bank-specific details and individual security features definable by the customer, which determine the course of the payment transaction, in the payments.

38. A method as claimed in claim 30, further comprising:

the customer, following transmission of price quotations for goods or services, transmitting the payments to sellers, wherein the payments are transmitted by the sellers to a checking system that checks the payments for validity and creditworthiness, and transmits information on a payment procedure to the sellers;

the sellers, on receipt of information from the checking system, indicating whether the payment procedure is acceptable; and the customer on receipt of the goods or service choosing to release the payments to complete the financial transactions.

39. A method as claimed in claim 30, wherein the security features compnse a course of the payment.

40. A method as claimed in claim 30, wherein the security features compnse a person who may use the payment.

41. A method as claimed in claim 30, wherein the security features comprise a category of goods or services which may be purchased by the payment.

42. A method as claimed in claim 30, wherein the security features comprise institutions or persons who must agree to a purchase using the means of payment.

* * * * *

UNITED STATES PATENT AND TRADEMARK OFFICE
CERTIFICATE OF CORRECTION

PATENT NO. : 7,353,210 B2  Page 1 of 1
APPLICATION NO. : 11/008079
DATED : April 1, 2008
INVENTOR(S) : Ralf Hochwimmer et al.

It is certified that error appears in the above-identified patent and that said Letters Patent is hereby corrected as shown below:

In column 10, claim 39, line 27, change "compnse" to --comprise--.

In column 10, claim 40, line 29, change "compnse" to --comprise--.

Signed and Sealed this

Eighth Day of July, 2008

JON W. DUDAS
*Director of the United States Patent and Trademark Office*